April 9, 1957            L. A. DIETZ            2,788,451
MASS SPECTROMETER SAMPLE INLET SYSTEM
Filed May 26, 1954            2 Sheets-Sheet 1
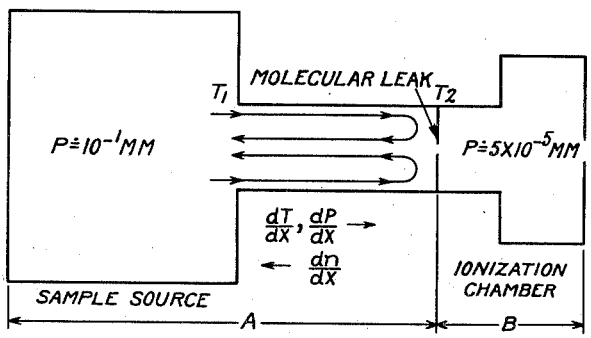
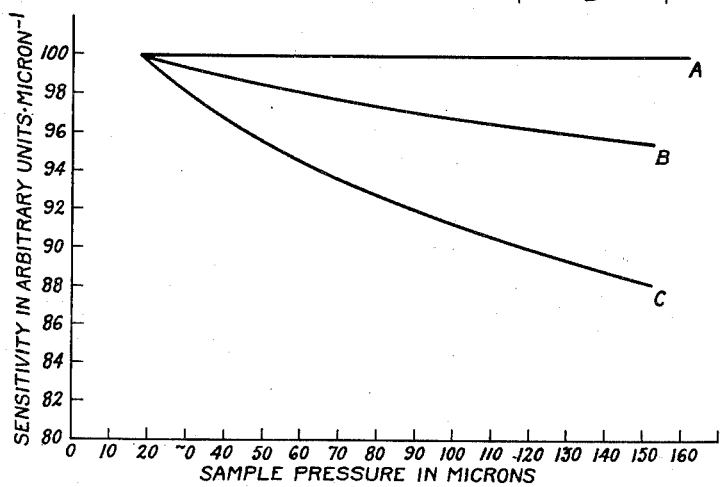
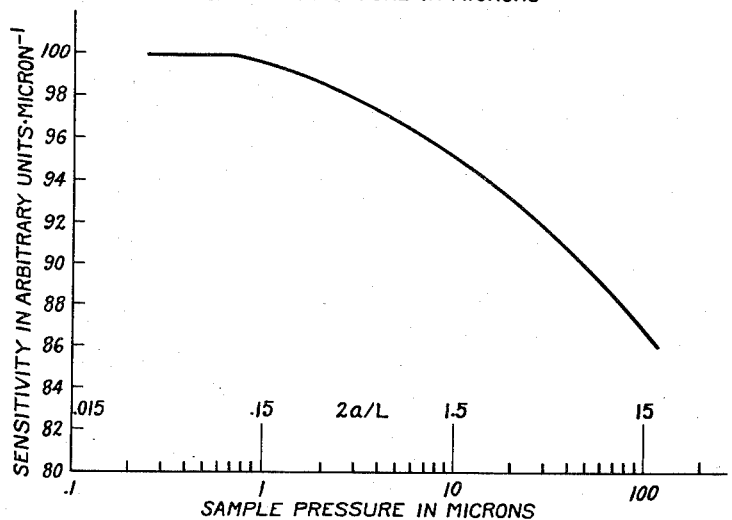
Inventor
Leonard A. Dietz
by Charles W. Helzer
His Attorney April 9, 1957
L. A. DIETZ
2,788,451
MASS SPECTROMETER SAMPLE INLET SYSTEM
Filed May 26, 1954
2 Sheets-Sheet 2
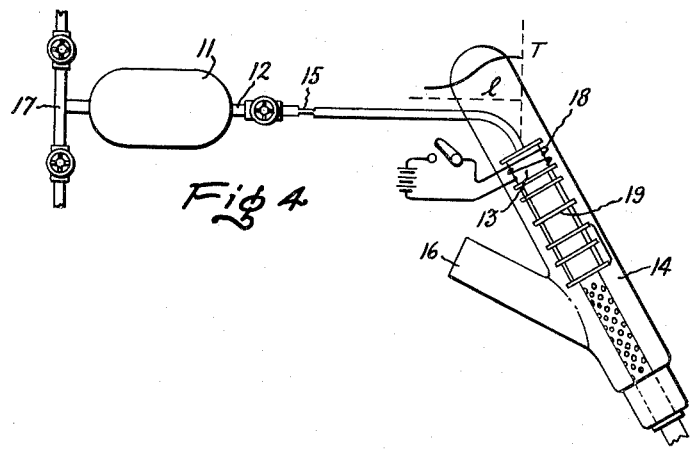
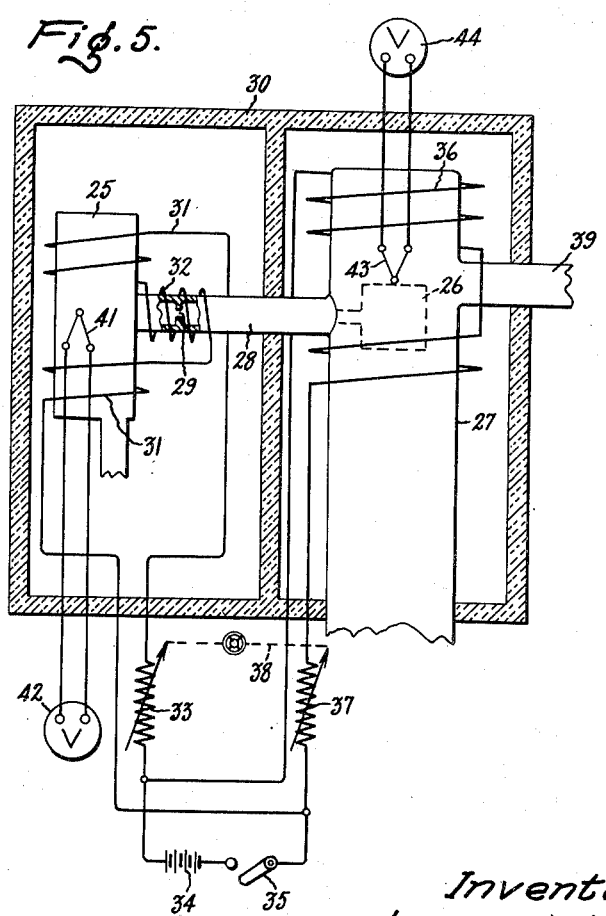
Inventor
Leonard A. Dietz
by Charles W Helzer
His Attorney United States Patent Office 2,788,451
Patented Apr. 9, 1957

2,788,451

MASS SPECTROMETER SAMPLE INLET SYSTEM

Leonard A. Dietz, Schenectady, N. Y., assignor to General Electric Company, a corporation of New York Application May 26, 1954, Serial No. 432,510

8 Claims. (Cl. 250—41.9)

The present invention relates to a mass spectrometer sample inlet system.

More particularly, the invention relates to a sample inlet system for introducing samples of a material to be analyzed in a mass spectrometer.

A mass spectrometer is an instrument for physically separating a sample of a material to be analyzed into its various constituents, and utilizes the combined action of electric and magnetic fields to effect this analysis. In order that an accurate analysis be obtained with the mass spectrometer, it is essential that the material actually acted upon by the mass spectrometer be a true replica of the material in question. If this condition can be obtained so that changes in the pressure of a sample gas in the sample source produce proportional changes in the output signal developed by the spectrometer, then the output signal can be relied upon as an accurate indication of the qualitative and quantitative character of the constituents of the material. In such circumstances, the instrument is said to have good linearity. One known means of obtaining relatively good linearity with the existing mass spectrometers has been to utilize a molecular leak in the sample inlet system of the instrument. By using such a leak in a sample inlet system having properly designed physical parameters, and operating the system over a correct pressure range, it is possible to transfer gaseous samples of the material to be analyzed into the analyzing portion of the spectrometer by a phenomenon known as free molecular flow. For a more detailed discussion of this phenomenon, reference is made to an article by R. E. Honig, appearing in the Journal of Applied Physics, vol. 16 (1945), page 646. For the purpose of the present discussion, it is sufficient to note that by achieving such transfer, the composition of the gaseous sample introduced into the analyzing portion of the spectrometer will be substantially identical to that in the sample source. It has been determined, however, that under certain conditions of pressure and temperature, the density of the gaseous sample introduced into the analyzing portion of the spectrometer differs from that in the sample source with resulting deterioration of the linearity of the spectrometer as exemplified by increasing instrument sensitivity aberration with changes in pressure of the gaseous sample. By increased instrument sensitivity aberration is meant that the amplitude of the output signal of the mass spectrometer is no longer proportional to the pressure of the gaseous sample in the sample source, and this departure from proportionality has increased from what it should be. In an ideal instrument, ratio of the output signal of the instrument to the pressure of the sample gas in the sample source (i. e. its sensitivity) should remain constant over a range of sample pressures with a corresponding zero instrument sensitivity aberration. Since it is not always possible to maintain constant sample pressure in the inlet system of a mass spectrometer, the resulting deterioration in the linearity of the spectrometer by reason of the increasing instrument sensitivity aberration can become intolerable. It has been further determined that the increasing instrument sensitivity aberration with changes in pressure of the gaseous sample can be ascribed to the occurrence of a phenomenon known as thermal transpiration. This phenomenon is to be described more fully hereinafter. However, for the present it is sufficient to point out that the instant invention is designed to overcome the undesirable effects thereof.

It is therefore a primary object of the present invention to improve the overall linearity of the mass spectrometer by overcoming the effects of thermal transpiration occurring in the sample inlet system thereof.

Another object of the invention is to provide a new and improved sample inlet system for a conventional mass spectrometer wherein the above-referred to effect of thermal transpiration is overcome.

A still further object of the invention is to provide a new and improved heated sample inlet system for a mass spectrometer wherein heated samples of materials may be analyzed, and wherein the effect of thermal transpiration is overcome.

In practicing the invention, a sample inlet system is provided for a mass spectrometer, and includes an inlet tube for connecting a sample source to the ionization chamber of the mass spectrometer. A molecular leak is positioned in the inlet tube at the point such that any thermal gradient existing in the inlet tube is located between the molecular leak and the ionization chamber of the mass spectrometer. In a preferred embodiment of the invention, a heated sample inlet system is provided which includes an inlet tube for connecting the sample source to the ionization chamber of a mass spectrometer. A molecular leak is positioned in the inlet tube, and means are provided for maintaining the temperature of the sample source and the portion of the inlet tube in which the molecular leak is disposed at a temperature such that any thermal gradient existing in the inlet tube is located between the molecular leak and the ionization chamber of the mass spectrometer.

Other objects, features, and many of the attendant advantages of this invention will be appreciated more readily as the same becomes better understood by reference to the following detailed description, when considered in connection with the accompanying drawings, wherein:

Fig. 1 is a schematic diagram of a typical sample inlet system for a mass spectrometer;

Fig. 2 is a graph showing the effect of thermal transpiration on the sensitivity of a mass spectrometer with changes in pressure of the sample introduced therein.

Fig. 3 is a composite curve formed from three sets of separate sensitivity vs. sample pressure curves by a method of successive expansions in order to define the relationship existing over a sufficiently wide range of pressures.

Fig. 4 is a schematic diagram of an improved sample inlet system for a conventional mass spectrometer; and Fig. 5 is a schematic diagram of a new and improved heated sample system for a mass spectrometer capable of analyzing heated samples of materials.

The extension of mass spectrometer analysis to compounds of high molecular weight usually requires the use of a heated sample inlet system to increase the vapor pressure of the sample to be analyzed. In such systems the temperature of the sample source and ionization chamber of the mass spectrometer are rarely identical, and frequently the temperature of the sample source may exceed that of the ionization chamber by 100° C. or more. Therefore a thermal gradient must exist somewhere along the inlet tube connecting the sample source to the ionization chamber of the mass spectrometer. Conversely, if the ionization chamber is heated to a temperature above room temperature as it is in conventional mass spectrometers, and the sample source is at room temperature, then a thermal gradient of opposite sign must exist somewhere along the inlet tube connecting the sample source to the ionization chamber. The effects of these thermal gradients on sample gas flow through the inlet tube can be explained by the kinetic theory of thermal transpiration, sometimes referred to as thermomolecular flow. Such effects should be seriously considered, since a large thermal gradient existing along the inlet tube to the mass spectrometer may cause substantial errors in the sensitivity calibration of the spectrometer if the transpiration phenomenon is not taken into account.

Thermal transpiration is always present when a gas is confined in a container which is unevenly heated, and can broadly be classified into three types in accordance with the pressure ranges existing in the space in which the gas is confined. These three types of thermal transpiration correspond respectively to high, intermediate, and low gas pressures. A range of absolute gas pressure values cannot be assigned to identify each of these respective types of thermal transpiration due to the fact that the phenomena is not dependent upon gas pressure alone, but also is a function of the physical parameters of the space in which it is confined. As will be disclosed hereinafter, the limiting cases of high and low pressure can be described theoretically with relative ease, however, in the case of the intermediate pressure region, considerable difficulty is encountered in attempting to predict theoretically what laws the thermal transpiration effect follows.

The two types of thermal transpiration which are of primary interest in connection with the sample inlet system of a mass spectrometer are those describing the gas behavior in the intermediate and low pressure regions. Fig. 1 of the drawings shows the regions of interest in schematic form. From an examination of Fig. 1, it can be determined that the intermediate pressure region of interest consists of region A formed by the sample source and the section of the inlet tube between the sample source and up to and including the molecular leak. The low pressure region of interest includes region B formed by the ionization chamber of the mass spectrometer and that portion of the inlet tube on the low pressure side of the leak. Thus, intermediate transpiration occurs in region A if a thermal gradient exists between the sample source and the molecular leak, and low pressure transpiration (hereinafter referred to as ultimate transpiration) occurs in region B if a thermal gradient exists between the molecular leak and the ionization chamber of the mass spectrometer. The direction of the temperature, pressure, and density gradients corresponding to the condition of $T_2$ greater than $T_1$ are also indicated in Fig. 1.

Since the pressure of the gas sample in the sample source decreases slowly with time, gas in the inlet tube connecting the sample source to the leak is approximately in a static condition of pressure. Therefore, the following discussion of the nature of the thermal transpiration condition will treat this portion of the sample inlet system as being in a static condition, and the valid assumption can be made that this treatment fairly represents the operating conditions existing in a typical sample inlet system of a mass spectrometer. The description set forth hereinafter would hold true, however, even if a positive flow of gas was taking place through the region in question. In the system shown in Fig. 1, gas is in effect confined in a long tube with closed ends, the length of the tube being greater than its diameter. If the density of the gas in the inlet tube is high enough so that the mean free path of the molecules comprising the gas is small as compared with the inlet tube diameter, then the intermediate pressure conditions exist. Assuming that the temperature of the sample source and both ends of the inlet tube are initially equal, heat is subsequently applied to the end $T_2$ while maintaining constant temperature at the other end $T_1$. Gas molecules near the wall of the tube now tend to drift along the wall toward the high temperature end $T_2$, and molecules adjacent the hot end $T_2$ begin an axial flow toward the cold end $T_1$. Thus, a pressure gradient is set up as a result of the temperature gradient with both gradients having positive sign in the direction toward the hot end. This thermomolecular gas flow is defined as thermal transpiration, and will continue indefinitely so long as a temperature difference is maintained at the two ends of the inlet tube. Mathematical expressions relating the density of the gas sample at the hot end $T_2$ of the inlet tube to the density of the gas sample at the cold end $T_1$ of the inlet tube are set forth below, and in subsequent passages are applied to the problem of gas sample flow through a mass spectrometer sample inlet system, and to the problem of sensitivity calibration of the mass spectrometer.

M. Knudsen, in an article appearing in Annalen der Physik, vol. 31 (1910), page 205, presented an equation which describes the behavior of gases in the low pressure region. This equation is of the form:

(1) $\quad dP/P = [(3/8)K/(1+2a/L)](dT/T)$ where $a$ is the radius of the tube, L is the mean free path of the gas molecules, P is the absolute pressure, T is the absolute temperature in degrees Kelvin, $dP$ is the pressure difference corresponding to temperature difference $dT$, and I is a coefficient which is a function of $a/L$ and varies as follows: K approaches zero as $a/L$ approaches infinity: K approaches 4/3 as $a/L$ approaches zero. It is to be noted, that in accordance with this equation the induced pressure gradient is a function not only of the temperature, but of the ratio of the inlet tube diameter to the mean free path of the molecules in the gaseous sample.

For the purpose of the following discussion Equation 1 can be transformed into a more useful form by the kinetic theory relation:

(2) $\quad P = nkT$ where $k$ is Boltzmann's constant, and $n$ is the density of the gas in molecules per cubic centimeter with $n_2$ being the density at the hot end $T_2$ of the inlet tube, and $n_1$ being the density of the gas at the cold end $T_1$ of the inlet tube. Substituting Equation 2 in Equation 1 results in the following expression:

(3) $\quad dn/n = \{[(3/8)K/(1+2a/L)]-1\}dT/T$

From an examination of Equation 3, and from a consideration of the conditions in the intermediate pressure region, namely, that the mean free path of the molecules in the gaseous sample is small compared with the tube diameter $2a$, it can be seen that the term in brackets of Equation 3 is always negative. Therefore, the density gradient $dn/dx$ is always opposite in sign to the temperature gradient $dT/dx$ and the density at the hot end of the inlet tube is always less than the density at the cold end. Furthermore, the ratio of the density at the hot end $T_2$ of the inlet tube to the density of the gas of the cold end $T_1$ of the tube is a nonlinear function of the pressure in the tube.

When considering the conditions of operation in the low pressure region (that is the conditions of ultimate transpiration) the mean free path of the gas molecules in the inlet tube becomes much greater than the diameter of the tube, and Equation 3 reduces to the following expression for the ultimate thermal transpiration condition:

(4) $\quad n_2/n_1 = (T_1/T_2)^{1/2}$

When the conditions of the high pressure region exist in the inlet tube, the mean free path of the gas molecules of the gaseous sample in the inlet tube become much less than the diameter of the tube, and Equation 3 reduces to the following expression for the high pressure condition.

(5) $\quad n_2/n_1 = T_1/T_2$

In the two preceding paragraphs, mathematical expressions have been set forth defining the two limiting regions of operation. From a consideration of these two expressions, it can be seen that the ratio of the gas density at the hot end $T_2$ of the inlet tube to the cold end $T_1$ of the tube, changes from a ½ power law of operation at low pressures to a first power law of operation at high pressures. Therefore it can be appreciated that in the intermediate pressure region between each of these two limiting conditions, which intermediate pressure conditions normally exist in the sample source and the portion of the inlet tube up to the molecule leak of a mass spectrometer, sample inlet system varies in some non-linear manner with variations in the pressure of the gas sample in this portion of the system.

Experimental data exists which verifies the theory set forth in the above discussion with regard to Equations 1 and 3. Curiously enough, the range of pressures and tube diameters involved in the experiments by which this data was obtained, correspond to the parameters and range of pressures involved in the sample inlet system of a mass spectrometer. Hence, by proper conversion, the data may be used to confirm the effect of thermal transpiration on gas flow in a mass spectrometer. The data was obtained by Tompkins and Wheeler in a report set forth in the Transactions of the Faraday Society, vol. 29 (1933), appearing on page 1248. In their experiments, Tompkins and Wheeler measured the ratio of $P_1/P_2$ for hydrogen which was contained in two vessels fixed at different temperatures, and connected by glass tubing having a 1 centimeter bore. The hot temperature $T_2$ was fixed at 298° Kelvin for the purpose of the experiment. The results obtained by Tompkins and Wheeler are presented in the first three columns of the table set forth below. The fourth and fifth columns were obtained by converting the $P_1/P_2$ ratio given in the second and third columns of the table by use of Equation 3. The final column of the table gives the ratio of the tube diameter to the means free path of the gas in question, namely, hydrogen at 298° Kelvin.

Table 1.—Effect of thermal transpiration on $P_1/P_2$ and $n_1/n_2$

| $P_2$ microns | $T_1=90°$ K. $P_1/P_2$ | $T_1=193°$ K. $P_1/P_2$ | $T_1=90°$K. $n_2/n_1$ | $T_1=193°$ K. $n_2/n_1$ | $2a/L$ |
|---|---|---|---|---|---|
| 10 | 0.716 | 0.854 | 0.422 | 0.759 | 1.07 |
| 20 | 0.817 | 0.907 | 0.370 | 0.714 | 2.15 |
| 40 | 0.929 | 0.951 | 0.325 | 0.681 | 4.30 |
| 60 | 0.985 | 0.977 | 0.307 | 0.663 | 6.44 |
| 80 | 1.019 | 0.988 | 0.297 | 0.655 | 8.59 |
| 100 | 1.033 | 0.996 | 0.292 | 0.650 | 10.7 |
| 120 | 1.034 | 1.001 | 0.292 | 0.647 | 12.9 |
| 140 | 1.034 | 1.004 | 0.292 | 0.645 | 15.0 |

From a comparison of the $n_1/n_2$ ratios in the above table with the results given by Equation 3, it can be seen that the values are in qualitative agreement. On the basis of this agreement, it is believed safe to assume that the data for hydrogen is at least representative for all gases. This assumption is corroborated by the fact that similar experiments were performed by Tompkins and Wheeler with carbon monoxide and argon as the gases, and the results obtained are in agreement with the results for hydrogen for pressures at which the mean free paths are equal.

Ordinarily, pressure of the gas sample in the sample source is assumed to be identical with the pressure of the gaseous sample at the molecular leak. When this condition is true, and the ionization chamber of the mass spectrometer is designed for high differential pumping, so that no non-linearities exist in the gas flow system beyond the molecular leak, the slope of the sensitivity vs. sample pressure curve of the mass spectrometer should be zero where the sensitivity is arbitrarily expressed as a certain number of chart divisions per micron of gas pressure in the expansion volume. When a thermal gradient exists along the inlet tube, however, the sensitivity will be proportional to $n_2/n_1$, since the gas flow through the molecular leak is proportional to the molecular gas density on the high pressure side of the leak.

The conductance F of an orifice or tube for free molecular flow is a function of the mass of the gas molecules comprising the sample, its temperature, and the geometry of the orifice or tube, but is independent of pressure. A mathematical expression relating conductance F to the above quantities in terms of volume flow per unit of time is set forth below.

(6)    $F = 3.638 K A (T/M)^{1/2}$ liters per second where F is the conductance of the orifice or tube in liters per second, K is a geometrical constant known as Clausing's factor, A is the orifice area in square centimeters, T is the absolute temperature in degrees Kelvin, and M is the molecular weight. When operating in the low pressure region and thermal transpiration effects exist, Equations 5 and 6 can be combined to give the flow rate through the molecular leak as (7)    $Q = n_2 F_0 = n_1 C (T_1^{1/2})$ molecules sec.$^{-1}$ where C is a constant of proportionality, and $F_0$ is the free molecular conductance in liters per second at the point in question. Equation 7 shows that the rate of gas flow through the molecular leak is independent of the temperature $T_2$ at the leak when operating in the low pressure region under the conditions of ultimate thermal transpiration, when such conditions exist in the inlet tube. Since the ratio $n_2/n_1$ in Equation 7 is a constant, the slope of the sensitivity vs. sample pressure curve is zero when operating under these conditions.

From the foregoing discussion, it can be seen that in a low pressure region, when the condition of ultimate thermal transpiration exists, the sensitivity of the mass spectrometer should remain substantially constant with changes in pressure of the sample in the inlet tube. In the intermediate pressure region, the sensitivity of the mass spectrometer should decrease as the pressure of the sample gas in the inlet tube increases, and the magnitude of this decrease in sensitivity over a given range of pressures should be strongly affected by the temperature difference between the sample source and the molecular leak so that the effect should be much less apparent for small temperature differences than it is for large temperature differences. In the high pressure region the sensitivity of the mass spectrometer should again level off and remain substantially constant with changes in pressure.

The thermal transpiration effects predicted in the preceding paragraph for both the low and intermediate pressure regions have been experimentally investigated in a mass spectrometer using argon as the sample gas. The results of this investigation are illustrated in Figs. 2 and 3 of the drawings. Fig. 2 of the drawings clearly confirms the strong dependence of the magnitude of the sensitivity aberration of a mass spectrometer on thermal transpiration effects produced by the existence of thermal gradients. In obtaining the graphs shown in Fig. 2 of the drawings, radiation from a heater wrapped externally on the inlet tube and adjacent the area of the molecular leak, heated the leak to a higher temperature than that of the sample source which was maintained at room temperature. Graph C of Fig. 2 illustrates the drop in sensitivity of the spectrometer with increasing pressure in the inlet tube as a result of a creation of a thermal gradient across the inlet tube. If the external heater is turned off, and the leak end of the inlet tube is allowed to cool for a sufficient period of time, curve (B) of Fig. 2 of the drawings is obtained, thus illustrating a decrease in the sensitivity aberration of the instrument due to the smaller thermal gradient across the inlet tube. If the leak end of the inlet tube is cooled down to room temperature, curve (A) having zero slope is obtained. These results clearly establish the validity of the conclusion set forth in the preceding paragraph, with regard to thermal transpiration effects in the intermediate pressure region. Fig. 3 of the drawing is a composite curve formed by combining three different sets of sensitivity vs. sample pressure curves by a method of successive expansions. The composite curve thus obtained clearly confirms the variation of sensitivity of the mass spectrometer with variations in sample pressure throughout the low and intermediate pressure regions.

From a consideration of the above set forth mathematical expressions pertaining to the effects of thermal transpiration in the inlet tube of a mass spectrometer sample inlet system, and of the data obtained from the experiments of Tompkins and Wheeler, taken in conjunction with the results of the investigation concerning the temperature dependence of thermal transpiration effects in the sample inlet system on the pressure vs. sensitivity characteristics of a mass spectrometer, the below listed conclusions are submitted to be valid. That thermal equilibrium in the sample inlet system is substantially reached a few seconds after introduction of the gas sample into the sample source of the system. Thermal transpiration is a total pressure effect in that the partial pressure of a given component of a gas mixture has the same sensitivity as if it alone were calibrated at the same pressure as the total pressure of the mixture. Further, from a consideration of Fig. 3 of the drawings, it can readily be demonstrated that thermal transpiration has no measurable effect on the accuracy of analysis given by a mass spectrometer when both the mixture to be analyzed and the calibration gases used with the mass spectrometer are run at constant pressure. This latter conclusion is not strictly valid from a theoretical viewpoint, since the mean free path, viscosity factors, and frictional resistance to gas flow along the surface of the inlet tube vary with gas composition. However, to a good approximation, the conclusion is valid.

In addition to the above conclusions, the applicant's initial discovery that the thermal transpiration effect can be substantially eliminated by properly positioning any thermal gradient that exists along the inlet tube of the sample inlet system with respect to the molecular leak, is entirely corroborated. In any practical situation, the density of the gas sample on the low pressure side of the molecular leak is always so low that low pressure region conditions (namely, ultimate thermal transpiration) exist between the molecular leak and the ionization chamber of the mass spectrometer even though a thermal gradient exists across this region. From a consideration of Fig. 3 of the drawings, and Equation 4, it can be appreciated that even under these conditions, the proportionality of the mass spectrometer output signal to gas inlet pressure is not destroyed, and hence, the linearity of the mass spectrometer remains unimpaired. Clearly then, if operating conditions are such that a thermal gradient must exist somewhere between the sample source and the ionization chamber of the mass spectrometer, the structure of the sample inlet system should be designed so that the thermal gradient occurs in the low pressure region between the leak and the ionization chamber. No thermal gradient should exist in the area between the sample source and the molecular leak in the inlet tube.

Referring now to Fig. 4 of the drawings, a sample inlet system for a mass spectrometer is illustrated which incorporates the novel features of the present invention. The sample inlet system includes a sample source 11 connected through an inlet tube 12 to an ionization chamber 13. The inlet tube 12 has a molecular leak 15 positioned therein for controlling the flow of the gaseous sample from the sample source 11 into the ionization chamber 13. Ionization chamber 13 is disposed within a mass spectrometer tube 14 which has a connection 16 to a vacuum pump for evacuating the region of the mass spectrometer tube surrounding the ionization chamber 13 as well as the analyzer section of the tube (not shown).

By reason of this construction, the ionization chamber 13 and the portion of the inlet tube 12 between the molecular leak 15 and the ionization chamber is maintained at pressure conditions corresponding to the low pressure region described in the preceding paragraphs. Representative samples of the gaseous material to be analyzed are introduced into the sample source 11 through a suitable supply conduit and valving arrangement indicated at 17, and the samples thus introduced, are maintained under pressure conditions such that the region comprising sample source 11 and the portion of inlet tube 12 between molecular leak 15 and the sample source corresponds to the intermediate pressure region described in the preceding discussion.

In operation, the gaseous sample to be analyzed is introduced into the ionization chamber 13 through the molecular leak 15 from the sample source 11 where it is ionized. The ions thus formed are then accelerated by an accelerating electrode structure 19, and projected into an analyzer region (not shown) where they are separated into ion beams in accordance with their mass to charge ratio, the ion beams being subsequently collected and measured in a well-known manner. To facilitate ionization of the gaseous sample in the ionization chamber 13, heating means such as a heating coil 18 is provided for maintaining ionization chamber 13 at some predetermined temperature. Such heating means generally comprise a part of most conventional analytical mass spectrometers. Because the ionization chamber 13 is heated by the heating coil 18, and because the sample source 11 is generally maintained at room temperature, a thermal gradient must necessarily exist between the ionization chamber 13 and the sample source 11. In the present invention, the sample inlet system is designed so that this thermal gradient falls between the ionization chamber 13 and the molecular leak 15. The incorporation of this feature into the design of applicant's sample inlet system is illustrated graphically by the graph positioned immediately over the portion of the inlet tube 12 connecting leak 15 to ionization chamber 13. In this graph the thermal condition or temperature of this portion of the inlet tube is plotted against its length with the temperature thereof being plotted as the ordinate and the length representing the abscissa. By designing the sample inlet system in this manner the thermal gradient therefor falls in the low pressure region existing between the molecular leak and the ionization chamber 13. Hence, in accordance with the theory established in the preceding discussion, any thermal transpiration effects throughout the range of operating pressures in the gas flow system will not adversely affect the sensitivity of the mass spectrometer.

Another form of a mass spectrometer sample inlet system incorporating the present invention is illustrated in Fig. 5 of the drawings. This system includes a sample source 25 connected to an ionization chamber 26 of a spectrometer tube 27 by an inlet tube 28. A molecular leak 29 is disposed in the inlet tube 28 for controlling the flow of gaseous sample from the sample source 25 into the ionization chamber. Sample source 25 and the portion of the mass spectrometer tube 27 containing ionization chamber 26 are enclosed in separate heat insulating compartments formed by a housing 30 designed to shield sample source 25 from the ionization chamber and vice versa, and to shield each of these portions of the system from their surroundings. The sample source 25 is heated by a heating means that comprises a heating coil 31 wound about the sample source 25. A portion 32 of the heating coil is also wound about the portion of the inlet tube 28 including a molecular leak 29. Heating current is supplied to the heating coil 31—32 through a variable load resistor 33 from a source of electric potential 34 that may be connected to the heating coil through a cutout switch 35. The source 34 has been illustrated as a source of direct current potential, however, alternating current potential could be used equally well. The portion of the mass spectrometer tube 27 including ionization chamber 26 is likewise heated by heating means comprising a heating coil 36 that surrounds the portion of the tube enclosing ionization chamber 36. Heating current is supplied to the heating coil 36 through a variable load resistor 37 connected between the heating coil and the source of direct current potential 34. If desired, the variable contacts on each of the variable load resistors 33 and 37 may be connected through a mechanical interconnection 38, and a central control knob may be supplied for maintaining the proportioned amount of heating current supplied through each of the load resistors 33, 37 to their respective heating coils. This proportion between the heating currents is initially established by separate adjustment of each of the load resistors 33 and 37. If desired, a temperature measuring thermocouple 41 may be disposed adjacent the sample source 25 with appropriate connections to a suitable indicating instrument 42 for indicating the temperature of the sample source 25, and a similar arrangement comprising a thermocouple 43 and indicating instrument 44 may be provided for indicating the temperature of the ionization chamber 26 of the mass spectrometer tube.

In operation, the material to be analyzed is placed in the sample source 25 where it is heated by the heating coils 31 to convert the same to a gaseous state. The gaseous sample then passes through the inlet tube 28 through the molecular leak 29 to the ionization chamber 26 where it is ionized. Ions of the gaseous sample thus formed are accelerated through a suitable accelerating electrode arrangement (not shown) and pass out through the mass spectrometer tube 27 to an appropriate analyzer section where they are separated and collected in the well known manner. The analyzer section and the portion of mass spectrometer tube 27 surrounding ionization chamber 26 are evacuated through a connection 39, so that the ionization chamber and the portion of inlet tube 28 between molecular leak 29 and ionization chamber 26 are maintained under pressure conditions corresponding to the low pressure region discussed above. The sample source 25 and the portion of the inlet tube 28 preceding leak 29 are maintained under conditions corresponding to the intermediate pressure region. Therefore, in order that the output signal from the mass spectrometer be truly representative of the quantitative and qualitative character of the sample introduced into the sample chamber 25, it is necessary that the heating current through the heating coils 31 and 36, respectively, be properly adjusted so that any thermal gradient existing in the inlet tube 28 falls between the molecular leak 29 and the ionization chamber 26. Hence, in view of the fact that the portion of the inlet tube extending between the molecular leak 29 and the ionization chamber 26 is operated in the low pressure region, any thermal transpiration effect in this region will not substantially adversely affect the sensitivity and overall linearity of the mass spectrometer. In addition to properly proportioning the value of the heating currents through each of the heating coils 31 and 36, the position of the temperature gradient along the inlet tube 28 may be further controlled by modifying the type of insulating material, and the positioning thereof with respect to the molecular leak to assure proper location of the thermal gradient to overcome the effect of the thermal transpiration.

While the mass spectrometer tubes illustrated in the systems shown in Figs. 4 and 5 of the well known sector type wherein separation of ions having different mass to charge ratios is effected by passing the ion beam produced in the ionization chambers through an appropriate analyzing magnetic field and subsequently collecting ions having a desired mass to charge ratio, the invention is not restricted to use with mass spectrometer tube of this type only but may be used with any one of the several types known heretofore. For example the tube may be the type disclosed in U. S. Patent No. 2,535,032 issued to Willard H. Bennett on December 26, 1950, wherein ions are separated according to mass to charge ratio by a plurality of linearly arranged unidirectional radio frequency potentials. Alternatively the tube may be of the form disclosed in U. S. Patent No. 2,570,158 issued to Paul O. Schissel on October 2, 1951, and assigned to the assignee of the present invention. In the Schissel arrangement, the ions formed therein are accelerated by a means of the alternating electric field acting against the force of electrostatic or direct electric field having a linear space distribution whereby the ions become separated in space according to mass to charge ratio. The mass spectrometer tube could also be of the form described by Robert V. Langmuir in U. S. patent application, Serial No. 669,044, filed May 11, 1946, and assigned to the assignee of the present invention. In the Langmuir tube, ions are accelerated in spiral paths by an alternating electric field in the presence of crossed magnetic field whereby ions have a natural frequency corresponding to the frequency of the alternating electric field are specially separated from the remaining ions. Additionally, while the invention has been described in connection with a gas flow system using a molecular leak, it is to be understood the invention is no way limited to use only with gas flow systems having a molecular leak, but may be incorporated in systems employing viscous, fractionating, non-fractionating or other types of leaks. In such event, the nature of the gas flow through the system changes; however, the theoretical considerations with regard to the thermal transpiration effects on the $n_2/n_1$ ratios (i. e., the ratio of the density of the gas in the hot end of the system to the density of the gas in cool end), remain true.

From the foregoing description, it can be appreciated that the present invention provides a means for improving the overall linearity of the mass spectrometer by overcoming the effects of thermal transpiration occurring in the sample inlet system thereof. In particular, the invention provides a new and improved sample inlet system for a conventional mass spectrometer wherein the effects of thermal transpiration occurring in the sample inlet system is overcome. Additionally, the invention provides a new and improved heated sample inlet system for a mass spectrometer wherein heated samples of a material to be analyzed may be exposed and wherein the effect of thermal transpiration occurring in the inlet tube is overcome.

Obviously, other modification and variations of the present invention are possible in the light of the above teachings. It is therefore to be understood that changes may be made herein which are within the full intended scope of the present invention as defined by the appended claims.

What I claim as new and desire to secure by Letters Patent of the United States is:

1. A mass spectrometer sample inlet system including in combination a sample source, an ionization chamber for a mass spectrometer tube, an inlet tube connecting said sample source to said ionization chamber, a leak positioned in said inlet tube, and means for maintaining substantially uniform temperature in the portion of said system from said sample source up to and including said leak.

2. A mass spectrometer sample inlet system including in combination a sample source, an ionization chamber for a mass spectrometer tube, means for heating said ionization chamber to a first predetermined temperature, an inlet tube connecting said sample source to said ionization chamber, means for heating said sample source and a portion of said inlet tube to a second predetermined temperature, and a leak positioned in the second predetermined temperature portion of said inlet tube at a point such that any thermal gradient existing between said sample source and said ionization chamber is located between said leak and said ionization chamber.

3. A mass spectrometer sample inlet system including in combination a sample source, an ionization chamber for a mass spectrometer tube, means for heating said ionization chamber to a first predetermined temperature, an inlet tube connecting said sample source to said ionization chamber, means for heating said sample source and a portion of said inlet tube to a second predetermined temperature, a leak positioned in said inlet tube, and means for proportioning said first and second temperatures to maintain substantially uniform temperature in the portion of said system from said sample source up to and including said leak.

4. A mass spectrometer sample inlet system including an inlet tube for connecting a sample source to the ionization chamber of a mass spectrometer, a leak positioned in said inlet tube, and means for maintaining the portion of said inlet tube from the sample source up to and including said leak at a substantially uniform temperature.

5. A mass spectrometer sample inlet system including, a sample source of a material to be analyzed, an ionization chamber, an inlet tube for connecting the sample source to said ionization chamber of a mass spectrometer, a leak positioned in said inlet tube, and means for maintaining said sample source and the portion of said inlet tube from the sample source up to and including said leak at a substantially uniform temperature.

6. A mass spectrometer sample inlet system including an inlet tube having one end adapted to be connected to a sample source and its other end adapted to be connected to the ionization chamber of a mass spectrometer, means for heating at least a portion of said inlet tube, and a leak positioned in the heated portion of said inlet tube at a point such that any thermal gradient existing in said inlet tube is located between said leak and the other end of said inlet tube.

7. A mass spectrometer sample inlet system including an inlet tube having one end adapted to be connected to a sample source and its other end adapted to be connected to the ionization chamber of a mass spectrometer, a leak positioned in said inlet tube, and means for maintaining the temperature of the portion of said inlet tube from its one end up to and including said leak at a value such that any thermal gradient existing in said inlet tube is located between said leak and the other end of said inlet tube.

8. A mass spectrometer sample inlet system including in combination a sample source of a material to be analyzed, an ionization chamber for a mass spectrometer tube, means for heating said ionization chamber to a first predetermined temperature, an inlet tube connecting said sample source to said ionization chamber, means for heating said sample source and a portion of said inlet tube to a second predetermined temperature, a leak positioned in said inlet tube, and means for proportioning said first and second predetermined temperature to locate any thermal gradient existing between said sample source and said ionization chamber between said leak and said ionization chamber.

References Cited in the file of this patent

UNITED STATES PATENTS 2,400,557    Lawlor _____ May 21, 1946

OTHER REFERENCES

"Gas Flow in the Mass Spectrometer," by Richard Honig, published in Journal of Applied Physics, vol. 16, November 1945, pages 646–654. Copy in Patent Office Library.

"Free Molecular Flow in Sample Inlet to the Mass Spectrometer," by Paul Zemany, published in Journal of Applied Physics, vol. 23, No. 8, August 1952, pages 924–927. Copy in Patent Office Library.